United States Patent
Greenwood

[11] 3,720,894
[45] March 13, 1973

[54] CURRENT MONITORING MEANS
[75] Inventor: Albert C. Greenwood, Angola, N.Y.
[73] Assignee: Westinghouse Electric Corporation, Pittsburgh, Pa.
[22] Filed: Nov. 3, 1971
[21] Appl. No.: 195,343

[52] U.S. Cl. ................................335/204, 335/154
[51] Int. Cl. ..............................................H01h 51/28
[58] Field of Search..............................335/204, 154

[56] References Cited
UNITED STATES PATENTS

| 3,213,231 | 10/1965 | Koltuniak et al. | 335/204 |
| 3,188,427 | 6/1965 | Cooper et al. | 335/204 |
| 3,569,880 | 3/1971 | Wahlgren | 335/154 |

FOREIGN PATENTS OR APPLICATIONS

| 982,463 | 2/1965 | Great Britain | 335/204 |

Primary Examiner—Roy N. Envall, Jr.
Attorney—F. H. Henson et al.

[57] ABSTRACT

A current monitoring device is disclosed for determining when a known maximum magnitude of direct current has been exceeded. A switching element operatively responsive to a given magnetic flux density vector $B_1$ to indicate that the maximum direct current has been exceeded, is adapted to be oriented at an angle $\alpha_1$ (including 0°) with respect to the magnetic flux density vector $B_2$ resulting from the direct current being monitored. Magnetic shielding is arranged in proximity to the switching element, the degree of proximity determining the magnitude of the magnetic flux $B_2$ which is diverted from the switching element.

The joint selection of the angle $\alpha_1$ and the positioning and selection of the magnetic shielding enables a wide range of direct currents to be monitored.

6 Claims, 12 Drawing Figures

CURRENT MONITORING MEANS

BACKGROUND OF THE INVENTION

1. Field of the Invention

This invention relates to current monitoring means for determining when a known magnitude of direct current has been exceeded.

2. Description of the Prior Art

A problem of considerable complexity arises in the monitoring of direct currents of large magnitudes. Obviously, since these currents are so large, the physical size of the conductors is correspondingly large and therefore expensive. The equipments used to detect excessive current magnitudes are fairly large and expensive, requiring careful calibration. The prior art has attacked the problem directly by measuring the IR drop through a shunt, and indirectly by measuring the flux field around the conductor.

SUMMARY OF THE INVENTION

This invention relates to current monitoring means for determining when a known maximum magnitude of direct current in a conductor has been exceeded. Switching means, operatively responsive to a finite magnetic flux density $B_1$ to indicate that the maximum direct current has been exceeded, are adapted to be oriented at an angle $\alpha$, including 0°, with respect to the magnetic flux density $B_2$ resulting from the direct current. The magnetic flux density acting on the switching means is a function of the cosine of $\alpha$.

Magnetic shielding means of predetermined geometry are positioned in spaced relationship to the switching means, the degree of proximity of the magnetic shielding means to the switching means determining the portion of the magnetic flux density $B_2$ which is diverted from the switching means. The joint selection of the angle $\alpha$ and the magnetic shielding means insures that the switching means will operatively respond when the known maximum direct current is exceeded.

DESCRIPTION OF EXEMPLARY EMBODIMENTS

Before beginning a description of the invention, it will be helpful to review the mathematical analysis upon which the invention is based, as well as certain background descriptions.

The invention utilizes a simple reed switch with magnetic shielding. The basic reed switch comprises solid metallic contact members sealed in a glass envelope. The contact members are of magnetic materials, the actual points of contact switching being appropriately plated with various precious metals such as gold, rhodium, silver, etc. The contact members are carefully positioned inside the glass envelope which is fused to these magnetic members to maintain specific contact spacings. The entire glass capsule is filled with an atmosphere for the appropriate contact switching conditions. This may, for example, be dry nitrogen for the more common switches or a high vacuum for high voltage switches.

Manufacture's rate reed switches in ampere turns. The rating is determined empirically by using a solenoid to encircle the reed switch for testing. If the length of the solenoid L is large with respect to its radius, the flux density at the center becomes:

$$B = \mu_o (NI/L) \qquad (1)$$

Where $B$ = magnetic flux density in weber/meter$^2$ $\mu_o$ = the permeability of free space in the rationalized MKS system of units (numerically $4 \pi \times 10^{-7}$ henry per meter or weber per meter ampere)

$NI$ = turns $x$ amperes = ampere turns.

$L$ = length in meters

Assume a reed switch is rated at 75 ampere turns and the solenoid has a length of $5.3 \times 10^{-2}$ meters.

$$B_{reed} = (4 \pi \times 10^{-7} \times 75)/(5.3 \times 10^{-2}) \qquad (2)$$

Where $B_{reed}$ = magnetic flux density at the center of reed.

$$B_{reed} = 1.78 \times 10^{-3} \qquad (3)$$

This is the minimum field for pick up or actuation of the reed switch.

The following calculations are for the magnetic flux density B for an arbitrary current I at a point y above the center of an infinitely long thin conducting strip.

Figure 8:
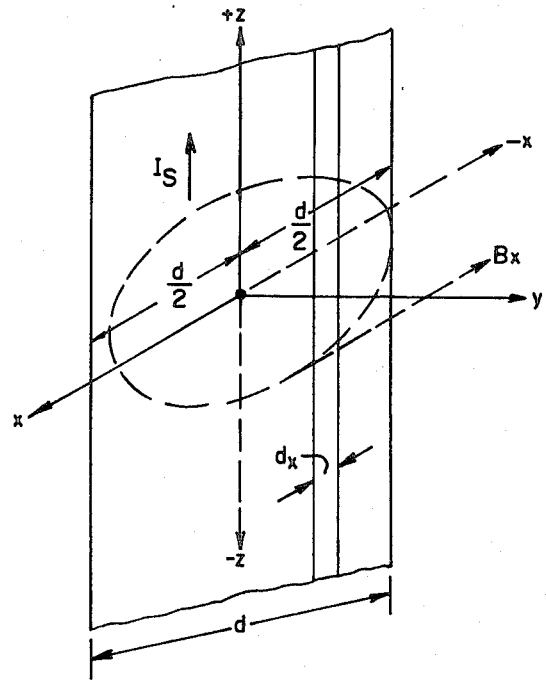
FIG. 8 is a view of an infinitely long conductor, defining the Cartesian coordinates $x,y,z$ used in the mathematical analysis of the invention.

Referring now to FIG. 8, there is shown a thin conducting strip of width $d$, infinitely long and carrying a current $I_s$ amperes per meter.

The field is seen to have components $B_x$ and $B_y$. The only magnetic flux density of interest is that in the $\pm X$ direction ($B_x$) because this flux goes through the reed switch from end to end and this is the only flux which will pick up or actuate the reed switch. From Biot-Savart's Law, the $B_x$ field is given by $$B_x = \frac{-\mu_o I_s}{2\pi} \int_{-d/2}^{d/2} \frac{y\,dx}{y^2 + x^2} \qquad (4)$$

Assume that $y = \frac{7}{8}$ inch above the center of a 6 inch ribbon conductor. Therefore, $y = \frac{7}{8}$ inch = $2.22 \times 10^{-2}$ meters; 6 inch = $15.24 \times 10^{-2}$ meter By definition $I_s = I/(6 \times 2.54 \times 10^{-2}) =$ (5)

$$I/(15.25 \times 10^{-2}) \text{ meters}$$

$$d/2 = 6''/2 = 3'' = 7.62 \times 10^{-2} \text{ meters} \quad (6)$$

Substituting the relationship of equation (5) and observing $y$ is a constant, equation (4) may be rewritten:

$$B_x = \frac{-\mu_0 I y}{2\pi \times 15.25 \times 10^{-2}} \int_{-d/2}^{d/2} \frac{dx}{y^2 + x^2} \quad (7)$$

The integral when evaluated is equal to $$\left[ +\frac{1}{y} \tan^{-1} \frac{x}{y} \right]_{-d/2}^{d/2} \quad (8)$$

Combining the relationships of equation (7) and (8)

$$B_x = \frac{-\mu_0 I}{2\pi \times 15.25 \times 10^{-2}} \frac{x}{y} \left[ \tan^{-1} \frac{x}{y} \right]_{-d/2}^{d/2} \quad (9)$$

$$B_x = \frac{-\mu_0 I}{2\pi \times 15.25 \times 10^{-2}} \left[ 2 \tan^{-1} \frac{d/2}{y} \right] \quad (10)$$

$$B_x = \frac{-\mu_0 I}{\pi \times 15.25 \times 10^{-2}} \left[ \tan^{-1} \frac{3}{.875} \right] \quad (11)$$

$$B_x = -I\, 2.62 \times 10^{-6} (1.285) \quad (12)$$

$$B_x = -3.37 \times 10^{-6} I \quad (13)$$

If $B_{reed} = B_x$ the reed switch will pick up. Therefore equating equations (3) and (13):

$$1.78 \times 10^{-3} = 3.37 \times 10^{-6} I \quad (14)$$

$$I = \frac{1.78 \times 10^{-3}}{3.37 \times 10^{-6}} = 528 \text{ amps} \quad (15)$$

This result can be verified experimentally.

The significance of negative sign for $B_x$ in equation (13) may be appreciated from a study of FIG. 8. In the three dimensional Cartesian coordinate system shown, a current in the +z direction, by the right hand rule produces an encircling magnetic field as shown. As may be observed in the plane $-xy$, the flux vector $B_x$ points in the $-x$ direction.

Figure 1:
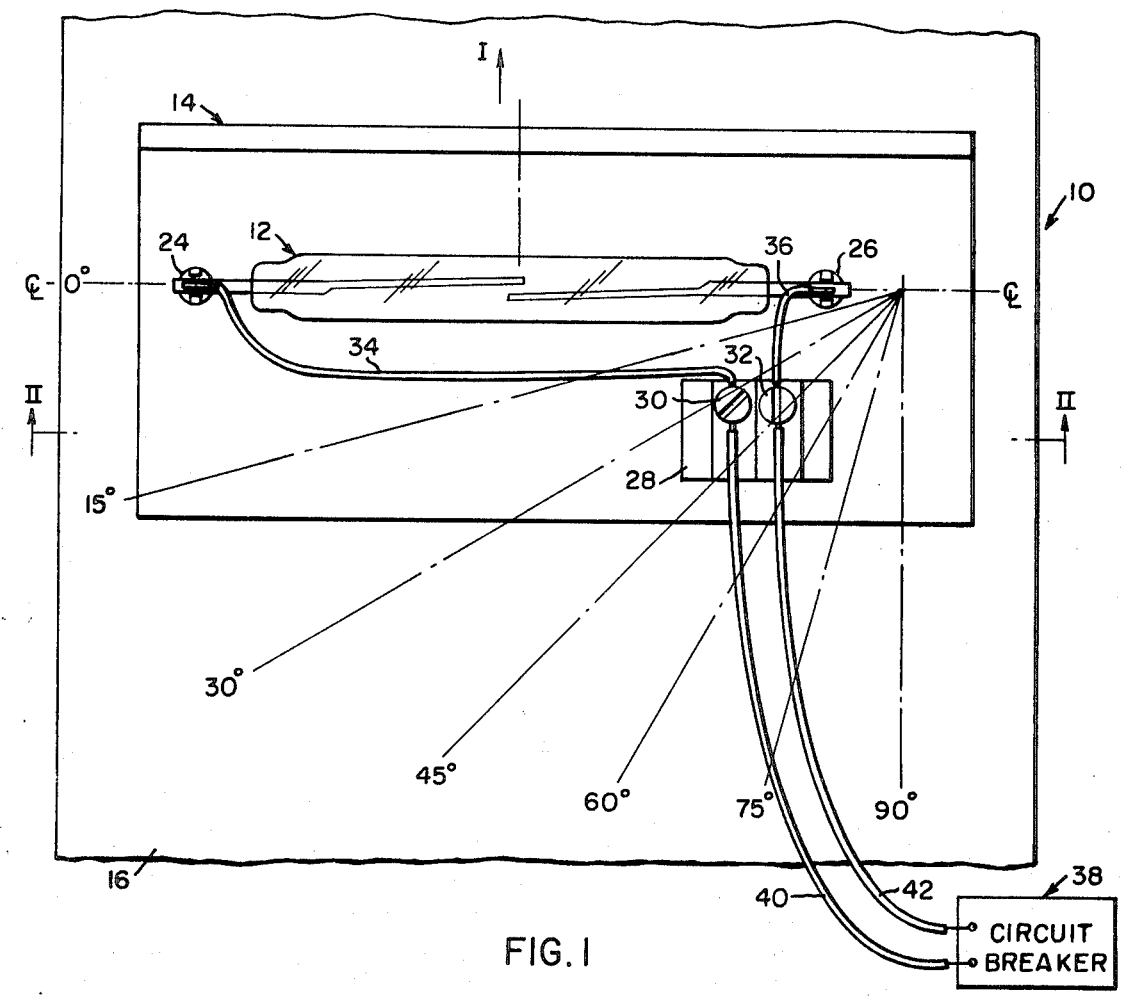
FIG. 1 is a top plan view of the current monitoring means in accordance with the invention.
Figure 2:
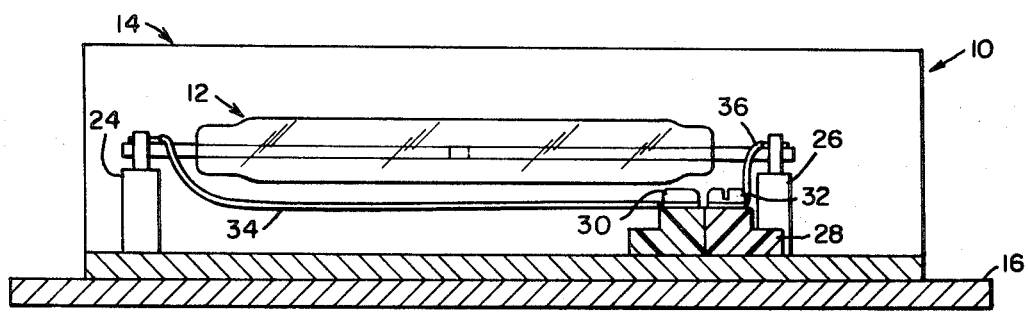
FIG. 2 is a front elevation of the current monitoring means taken along line II—II of FIG. 1.

Referring now to FIGS. 1 and 2, in accordance with the invention there is disclosed a current monitoring means indicated generally at 10, comprising a reed switch indicated generally at 12 and a magnetic shield means indicated generally at 14. The current monitoring means 10 is mounted on a bus bar conductor 16 carrying a direct current $I$ which is to be monitored.

Figure 3A:
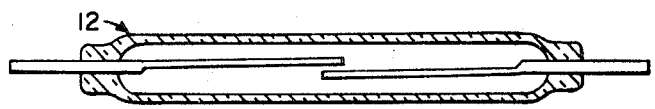
FIG. 3A is a normally open reed switch.
Figure 4A:
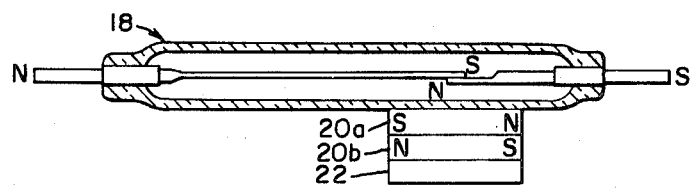
FIG. 4A is a normally closed reed switch.

The reed switch 12 is of the normally open type as shown in the enlarged sectional view in FIG. 3A; however, it could also be of the normally closed type indicated generally at 18 and disclosed in the enlarged sectional view of FIG. 4A.

The normally closed switch 18 includes dual magnetic biasing magnets 20a and 20b arranged in attractive position as shown, and including a keeper of magnetic material 22.

The reed switch 12 is mounted on the magnetic shield means 14 by means of stand-off members 24, 26 which are of insulating material.

A mounting block of insulating material 28, having conductive screws 30, 32 is mounted on the magnetic shield 14 in any convenient manner. Leads 34, 36 connect the ends of the reed elements to the screws 30, 32. A circuit breaker or alarm circuit indicated symbolically at 38, is connected to screws 30, 32 by means of leads 40, 42 respectively.

Figure 5A:
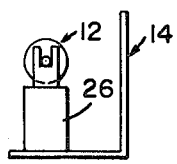
FIGS. 5A, 5B are sectional views showing the magnetic shielding means in the L-configurations.
Figure 5B:
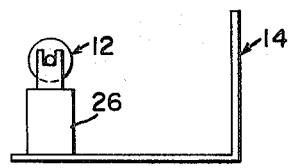

The magnetic shield member 14 may take various forms. In the embodiment of FIGS. 1 and 2, the magnetic shield member is an L-shaped member as illustrated in FIGS. 5A and 5B. Note that in FIG. 5A, the shield member 14 is closer to the reed member 12 than in the FIG. 5B configuration.

Figure 6A:
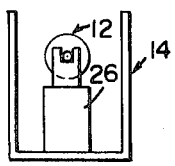
FIGS. 6A, 6B are sectional views showing the magnetic shielding means in the channel configurations.
Figure 6B:
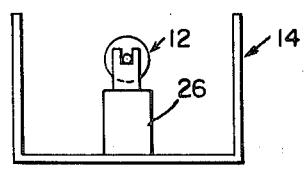

Similarly, the magnetic shield member 14 may be a channel member as illustrated in FIGS. 6A and 6B. Again it should be noted that the sides of the channel member are closer to the reed switch 12 in the FIG. 6A configuration than in the FIG. 6B embodiment.

OPERATION

Figure 3B:
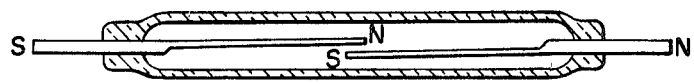
FIG. 3B is a polarized schematic of the reed switch of FIG. 3A used in explaining its operation.

A reed switch 12 of the normally open type such as illustrated in FIG. 3A, assumes the polarity indicated in FIG. 3B. As the current increases (and hence the ambient magnetic flux), the north pole at the tip of one of the reed members and the south pole at the tip of the other reed member will attract or pick up.

Figure 4B:
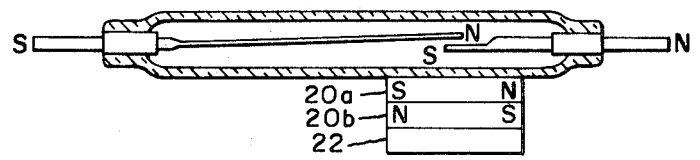
FIG. 4B is a polarized schematic of the reed switch of FIG. 4A used in explaining its operation.

When the reed switch is of the normally closed type 18 shown in FIG. 4A, the biasing magnets establishes the magnetic polarity of the reed members as illustrated in FIG. 4A. The ambient magnetic field opposes the biasing magnetic field so established and the contacts will open under proper field conditions as a result of the spring tension of the movable contact (FIG. 4B).

The reason that two biasing magnets 20a and 20b are utilized arises from the fact that a continuous line current will either oppose or aid the internal magnetic field of a biasing magnet, thereby changing the calibration of the switch. With bar magnets arranged as at 20a and 20b the flux produced by the conductor is perpendicular to the internal flux and will not therefore affect the magnetic biasing strength.

Figure 7:
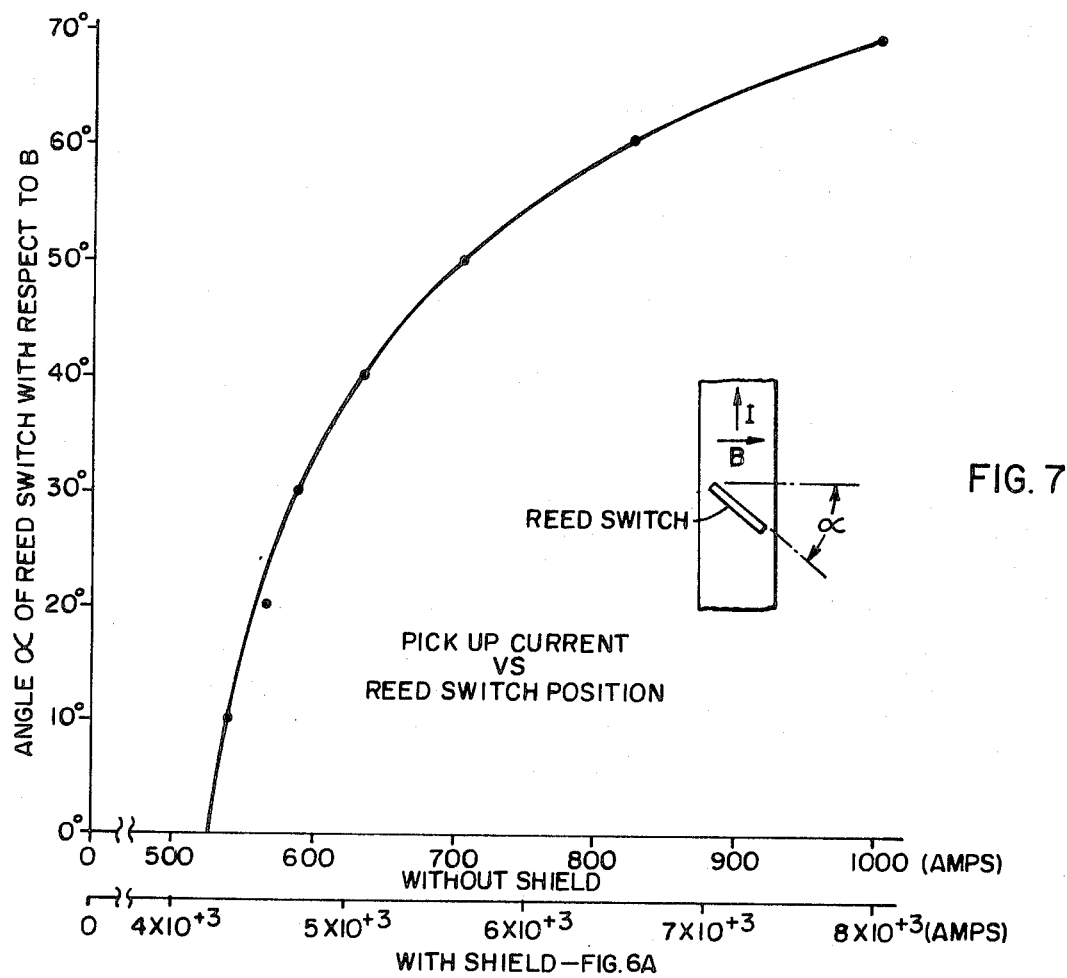
FIG. 7 is a diagram depicting the pick up current for various reed switch positions defined by the angle $\alpha$.

Referring now to FIG. 1, when the reed switch 12, without the shield member 14, is normal or perpendicular to the direction of current i.e. the center line marked 0°, then = 530 amps of current will cause the reed members to pick up, that is they will close if of the type in FIG. 3A or open if of the type shown in FIG. 4A. As the reed member 12 is rotated through the angles indicated in FIG. 1, the reed members will pick up at higher current magnitudes as depicted in FIG. 7. The flux through the reed switch 12 is a function of the cosine of the angle $\alpha$ (FIG. 7). A high degree of precision may be maintained in the region 0°–70°.

When the magnetic shields means of FIGS. 5A, 5B, 6A and 6B are utilized, these magnetic shields divert some of the flux away from the reed switch 12. For example, the reed switch alone without shielding picks up when $\alpha = 70°$ at 1,000 amps. With the shield member shown in FIG. 6A, and at $\alpha = 70°$, the reed switch picks up at 8,000 amps. The closer the shielding is to the reed switch 12, the larger the field (and hence the current) required to pick up.

Thus through judicious selection of shielding and proper angular rotation $\alpha$ a current monitoring means can be obtained which is responsive to a wide range of current magnitudes.

With either the closing or the opening of the reed members 12 or 18 respectively, a circuit breaker or alarm 38 will indicate that excessive current is flowing through the conductor, 10, enabling corrective action to be undertaken.

I claim:

1. Current monitoring means for determining when a known maximum magnitude of direct current in a conductor has been exceeded, comprising:
   a. switching means operatively responsive to a finite magnetic flux density $B_1$ to indicate that said maximum of direct current has been exceeded, and adapted to be oriented at an angle $\alpha$ including 0° with respect to the magnetic flux density $B_2$ resulting from said direct current, the magnitude of the flux acting on said switching means being a function of cosine $\alpha$; and
   b. magnetic shielding means of predetermined geometry, positioned in spaced relationship to said switching means, the degree of proximity of said magnetic shielding means determining the portion of magnetic flux density $B_2$ which is diverted from said switching means, whereby the joint selection of angle $\alpha$ and the magnetic shielding means insures that the switching means will operatively respond when said known maximum direct current is exceeded.

2. Current monitoring means according to claim 1 wherein said angle $\alpha$ is in the range 0°–70°.

3. Current monitoring means according to claim 1 wherein said switching means is a reed switch having cooperating closure members of magnetic material.

4. Current monitoring means according to claim 1 wherein said magnetic shielding means is of L-shaped cross sectional area having its longitudinal axis parallel to the longitudinal axis of said switching means.

5. Current monitoring means according to claim 1 wherein said magnetic shielding means is of channel shaped cross sectional area having its longitudinal axis parallel to the long axis of said switching means.

6. Current monitoring means for detecting when a known maximum magnitude of direct current in a bar conductor has been exceeded comprising:
   a. reed switching means operatively responsive to a magnetic flux density vector $B_1$ to indicate that said known maximum magnitude of direct current has been exceeded, adapted to be displaced at an angle $\alpha$, including 0°, with respect to the magnetic flux density vector $B_2$ resulting from the direct current being monitored, the magnitude of the flux density vector linking with said reed switching means being a function of the cosine of $\alpha$; and
   b. magnetic shielding means positioned in proximity to and parallel to the longitudinal axis of said reed switching means for diverting part of the magnetic flux density $B_2$ from said reed switching means, whereby the joint selection of the angle $\alpha$ and the magnetic shielding means insures that the reed switching means will operatively respond when said known maximum direct current is exceeded.

* * * * *